March 7, 1961 L. F. VOSS 2,973,876
MANURE LOADER
Filed May 14, 1959 5 Sheets-Sheet 1

INVENTOR
LEON F. VOSS

BY Braddock and Braddock
ATTORNEYS

March 7, 1961 L. F. VOSS 2,973,876
MANURE LOADER
Filed May 14, 1959 5 Sheets-Sheet 2
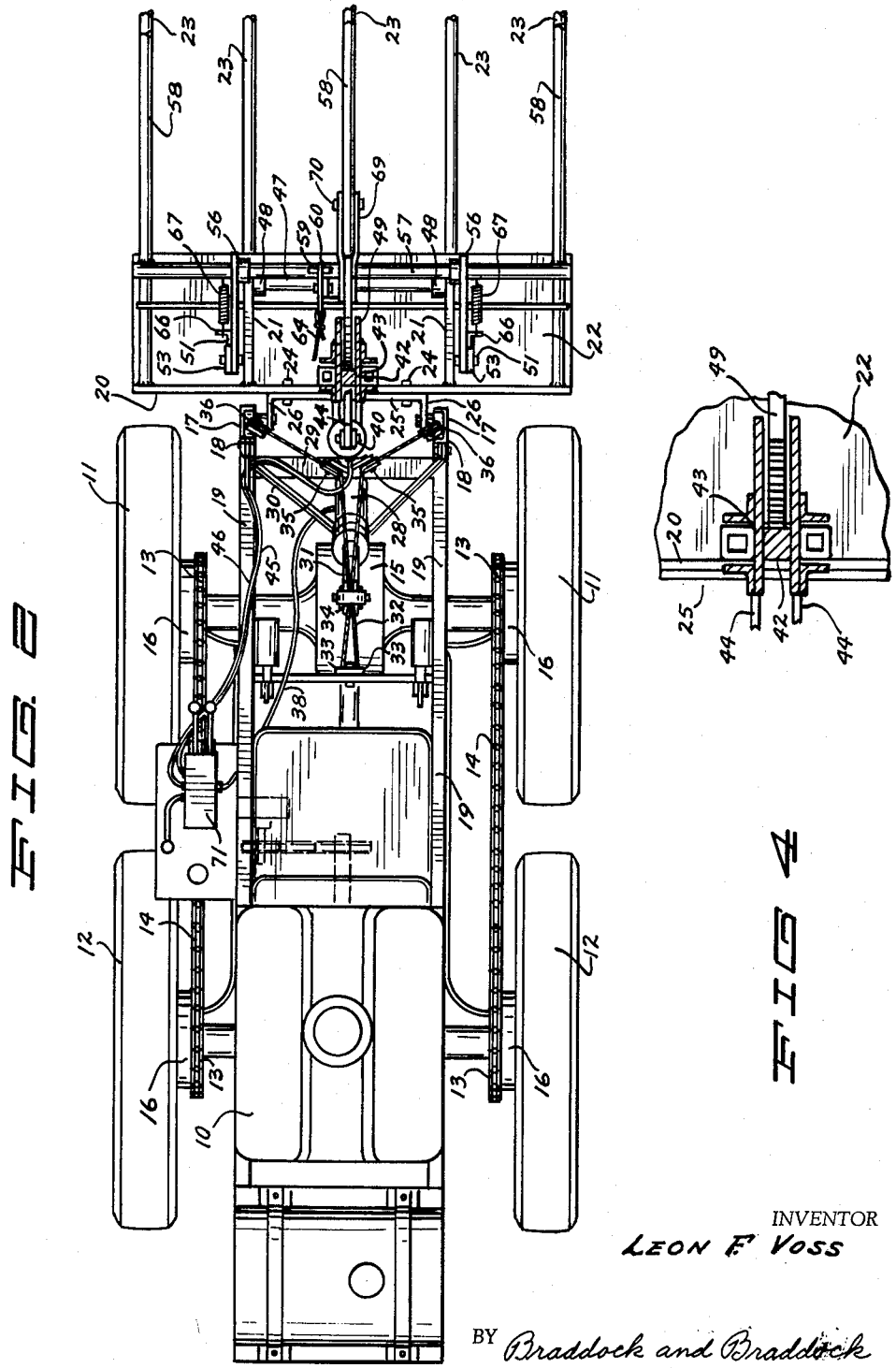
INVENTOR
LEON F. VOSS
BY Braddock and Braddock
ATTORNEYS

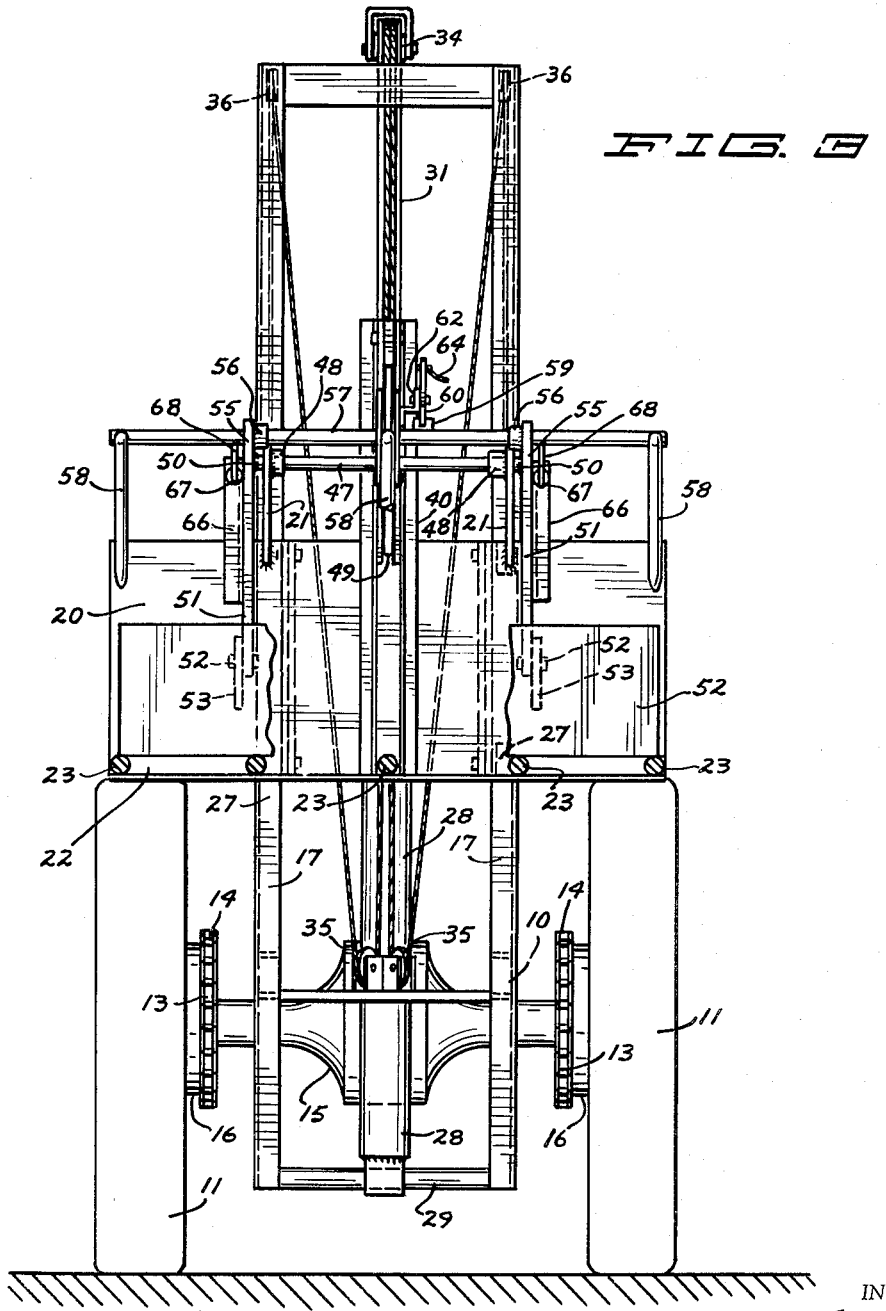

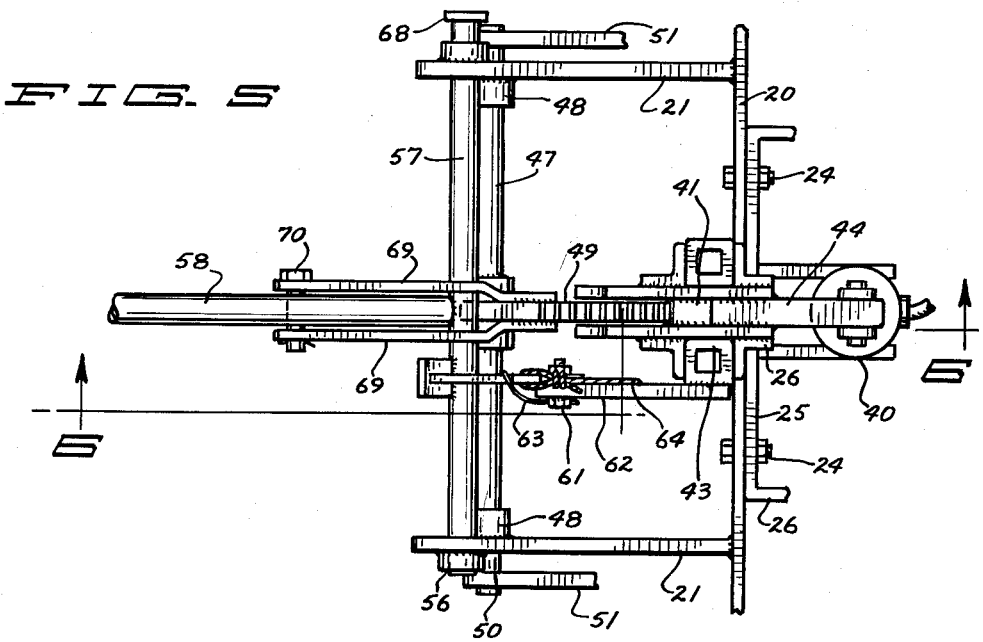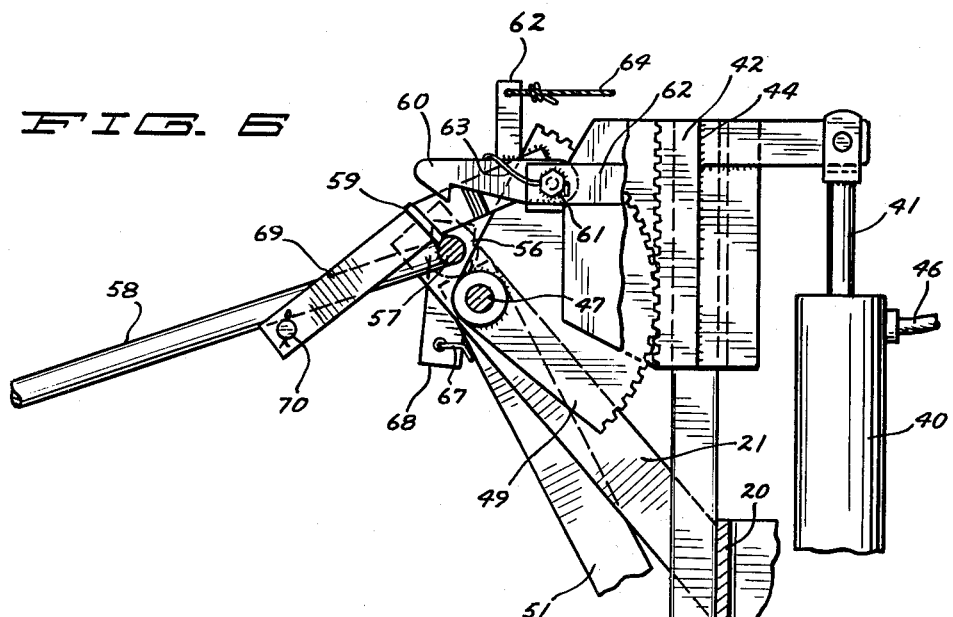

March 7, 1961  L. F. VOSS  2,973,876
MANURE LOADER
Filed May 14, 1959  5 Sheets-Sheet 5
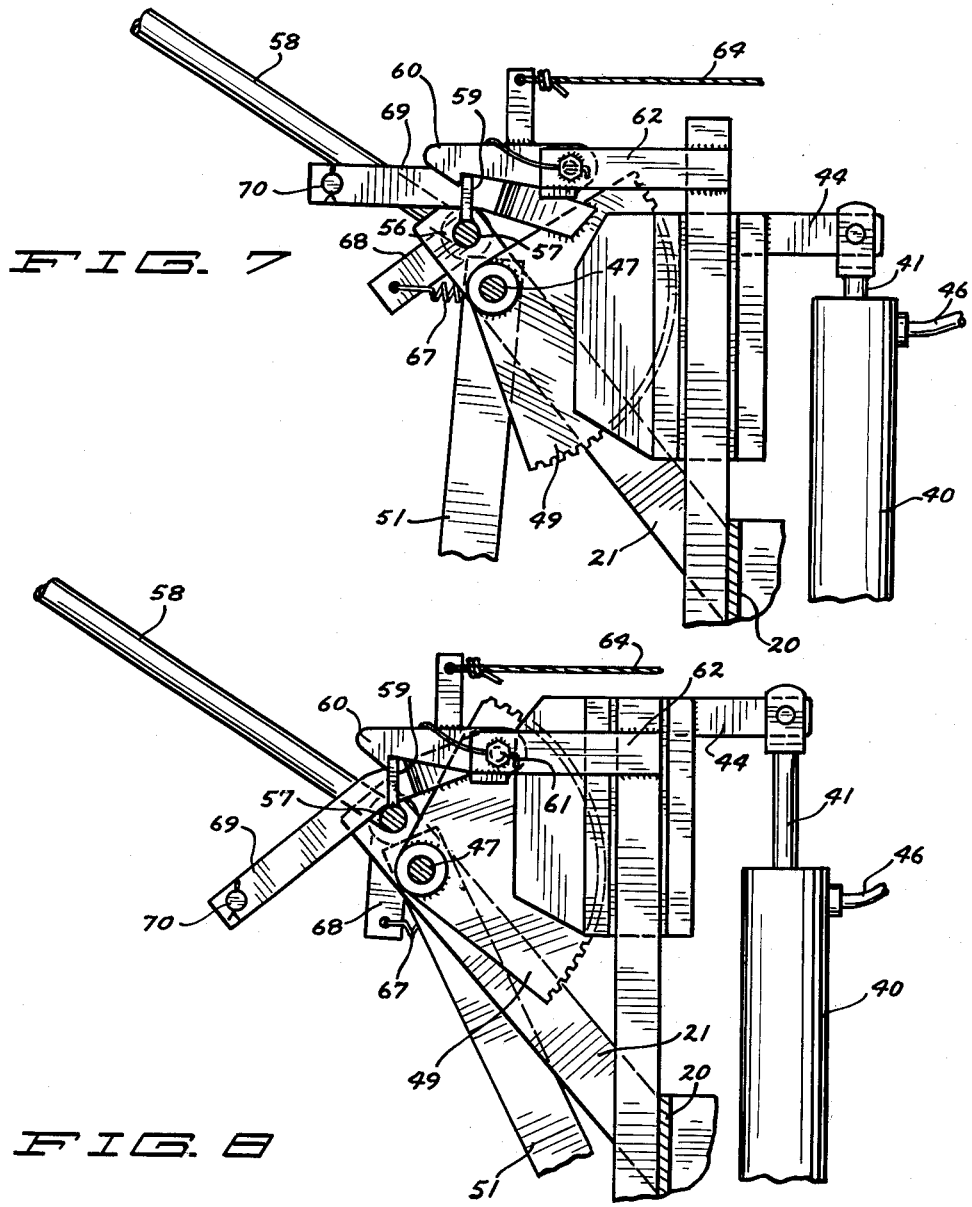
INVENTOR.
LEON F. VOSS
BY
Braddock and Braddock
ATTORNEYS

United States Patent Office 2,973,876
Patented Mar. 7, 1961

2,973,876

MANURE LOADER

Leon F. Voss, Lakefield, Minn.
(Jackson, Minn.)

Filed May 14, 1959, Ser. No. 813,221

6 Claims. (Cl. 214—654)

The invention herein has relation to a manure loader of simple, new and improved construction, useful for many purposes but devised to be especially useful for the purpose of entering a usually narrow door of a barn to remove manure from the floor thereof.

In the accompanying drawings forming a part of this specification,

Fig. 2 is an enlarged sectional view, taken on line 2—2 in Fig. 1;

Fig. 3 is a further enlarged front elevational view of said manure loader;

Fig. 4 is a detail sectional view;

Fig. 5 is an enlarged fragmentary plan view of the manure loader;

Fig. 6 is a vertical sectional view, taken on line 6—6 in Fig. 5;

Fig. 7 is a sectional view corresponding with the disclosure of Fig. 6 showing parts in different positions; and Fig. 8 is a sectional view similar to those of Figs. 6 and 7 showing parts in still other positions.

Figure 1:
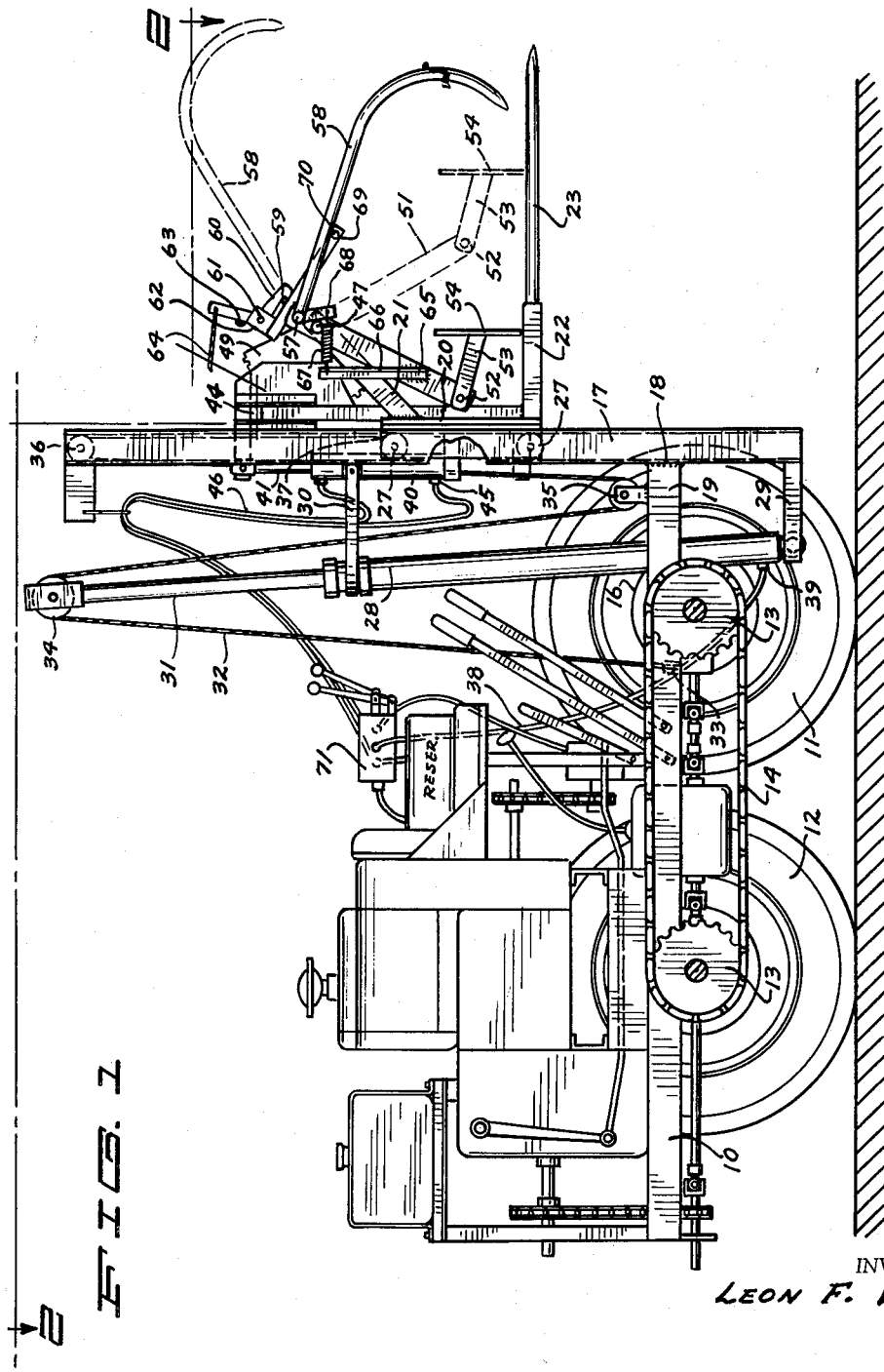
Fig. 1 is a side elevational view of a manure loader made according to the invention.

A transporting vehicle of or for the manure loader is constituted as a frame 10 supported on oppositely disposed, forward and rearward wheels, denoted 11 and 12, respectively. Sprocket wheels, each represented 13, are fixed on driven shafts rigid with the right and left wheels, respectively, and right and left, longitudinally extending sprocket chains 14 ride the right and left sprocket wheels, respectively. The forward and rearward wheels can be driven in a well known manner, through the instrumentality of the sprocket wheels and chains, and steering and turning of the vehicle can be accomplished by employment of differential mechanism 15 for varying the rate of speed of advance or reverse movement of the driven shafts for the right and left sets of wheels, respectively. Stated otherwise, the right and left driven shafts are interconnected by differential mechanism which permits the speed of travel of either of the sets of right and left driven shafts in either direction to be retarded, as by brakes 16, while the other set is propelled.

Spaced vertical bars, each denoted 17, are rigid, as at 18, with the forward ends of spaced, longitudinally extending members, each indicated 19, of the vehicle frame. The upper ends of the vertical bars 17 terminate in a single horizontal plane at a considerable distance above and the lower ends of said vertical bars terminate in a single horizontal plane a much shorter distance below the longitudinally extending frame members. The spaced vertical bars 17 are channel members in opposed relation and constitute guides for a vertically movable carriage of the manure loader.

The carriage includes an upright vertical, transversely extending member 20 at the rear thereof, transversely spaced, vertical, longitudinally extending arms 21 rigid with and extending forwardly and upwardly from the member 20, and a horizontal, transversely extending platform 22 beneath said arms and rigid with the lower end of said member 20. Transversely spaced, longitudinal prongs 23 are rigid with and in the plane of the platform 22 and extend forwardly from the forward edge thereof.

The vertical member 20 of the carriage is rigid, as at 24, with a vertical, transversely extending rectilinear plate 25, and the opposite ends of said rectilinear plate terminate in spaced, longitudinally and rearwardly extending flanges, each denoted 26. Outwardly extending, upper and lower rollers, each indicated 27, supported by said flanges, respectively, are disposed between the flanges of the channel members 17, 17, respectively, in adjacent relation to the bases thereof to be capable of having movement longitudinally, upwardly and downwardly, of said channel members.

An upright cylinder 28, supported, as at 29, upon lower ends of the vertical bars or channel members 17, is made rigid, as at 30, with intermediate portions of the spaced vertical bars or channel members, and a piston within and extending upwardly from the upright cylinder 28 is denoted 31. The cylinder with piston is at the rear of and in spaced relation to said spaced vertical bars or channel members.

Cables, each represented 32, have inner ends thereof anchored, as at 33, to a fixed part of the vehicle frame and extend upwardly and forwardly over a sheave 34 supported on the upper end of the piston 31. Thence the cables extend first downwardly and forwardly under sheaves 35 supported on the vehicle frame and then upwardly over sheaves 36 supported on the upper ends of the vertical bars or channel members 17, respectively. The outer ends of the cables 32 are suitably and conveniently secured, as at 37, to the vertically movable carriage.

A hose 38 leads from a source (not shown) of hydraulic fluid under pressure and enters, at 39, a lower end portion of the upright cylinder 28 below the piston 31. A valve construction 71 is for controlling flow of hydraluic fluid into and out of the upright cylinder 28.

Fluid under pressure will be forced into the upright cylinder 28, by way of the hose 38, when it is intended that the carriage be elevated, and fluid under pressure will be permitted to become removed from said upright cylinder, by way of said hose, when it is intended that said carriage be lowered. Fluid forced into the upright cylinder 28 will force the piston 31 and the sheave 34 thereon to become elevated to pull the portions of the cables 32 between the sheave 34 and the sheaves 35 upwardly and the portions of said cables between said sheaves 35 and the sheaves 36 downwardly, thus to elevate the carriage, and upon release of fluid under pressure from the upright cylinder the carriage will become lowered by gravity.

The rearward surface of the rectilinear plate 25 rigidly supports an upright cylinder 40, and a piston 41 in said cylinder extends upwardly to position above the upper end of the vertical, transversely extending member 20 of the carriage. A forwardly facing vertical rack 42, contiguous with the forward surface of said vertical, transversely extending member, is slidably guided, as at 43, for longitudinal movement upwardly and downwardly. Upper ends of the piston 41 and the vertical rack 42 are rigidly interconnected, as at 44, at a location above the upper end of the vertical, transversely extending member 20.

Hoses, denoted 45 and 46, respectively, lead from a source (not shown) of supply of fluid under pressure to locations of the cylinder 40 above and below the piston. The valve construction 71 is also for controlling flow of hydraulic fluid into and out of the cylinder 40.

When it is intended that the piston 41 and the rack 42 be raised hydraulic fluid is forced into said cylinder 40, by way of the hose 45, beneath the piston 41 while pressure is relieved, by way of the hose 46, above the piston, and when it is intended that said piston and rack be lowered hydraulic fluid is forced into the cylinder, by way of said hose 46, above said piston while pressure is relieved, by way of said hose 45, below the piston.

A cross shaft 47, rotatably mounted in spaced bearings 48 provided by the upper, forward ends of the vertical arms 21 of the carriage fixedly supports a vertical, longitudinally extending quadrant 49 having teeth on the rearward surface thereof which are in mesh with the rack 42, and the opposite end portions of said cross shaft extend to position outwardly beyond said vertical arms.

The opposite ends of the cross shaft 47 are rigid, as at 50, with intermediate portions of vertical wiper levers, each represented 51, which extend downwardly from said cross shaft in spaced relation to said vertical arms. The lower ends of the wiper levers 51 are pivotally secured, as at 52, to the rearward ends of pieces 53 rigid with and extending rearwardly from a wiper plank 54 disposed transversely of the manure loader.

Upper end portions, each indicated 55, of the wiper levers 51 rigidly support spaced bearings, each represented 56, situated a trifle above the spaced bearings 48 in transverse and horizontal alinement. The spaced bearings 56 rotatably support a transverse shaft 57, and transversely spaced, curvilinear tongues, each designated 58, are rigid with and extend longitudinally forwardly from said transverse shaft 57. The spaced tongues 58 are for insuring that manure loaded on the platform 22 and the prongs 23 of the carriage will not become unintentionally removed therefrom.

An upwardly extending lug 59 rigid with an intermediate portion of the transverse shaft 57 extends upwardly therefrom, and a latch 60, rotatably mounted, as at 61, on a protuberance 62 integral with the quadrant 49 is for retaining the tongues 58 in elevated position, as in dotted in lines in Fig. 1 of the drawings. A torsion spring 63 is for retaining the latch 60 in engagement with the lug 59, and a cord 64 is for accomplishing manual release of said lug.

The wiper levers 51 rigidly support, as at 65, upwardly extending posts 66, and the upper ends of said posts are connected by tension springs 67 with the lower ends of ears 68 rigid with and extending downwardly from intermediate portions of the transverse shaft 57. A lifter 69 is rigid with and extends forwardly from the quadrant 49, and a cross pin 70 is engageable with an intermediate portion of a lower surface of the center tongue 58.

When the manure loader is out of use, the carriage may be at any selected elevation on the spaced vertical bars or channel members on the frame of the vehicle. The wiper levers with wiper plank desirably will be situated as in full lines and the curvilinear tongues will be as in dotted lines in Fig. 1. Before commencement of operation of the manure loader, the carriage will be adjusted, by raising or lowering, to the desired elevation and the vehicle will be advanced to scoop up a load. When the load shall have been deposited on the prongs 23 and the platform 22 the cord 64 will be manually pulled to release the latch 60 from the lug 59 thus to permit the tension springs 67 to become operative to rotate the transverse shaft 57 and lower the curvilinear tongues 58 until their downward movement is arrested, either by engagement with the load or engagement of the center tongue with the cross pin 70.

The carriage will be manipulated to the intended position before each load is removed from the platform and prongs. To accomplish unloading, hydraulic fluid will be forced into the upper end of the cylinder 40 thus to force the piston 41 and the rack 42 downwardly. Downward movement of the rack will rotate the quadrant 49 in counterlockwise direction in Fig. 1 and swing the wiper levers, rigid with said quadrant, through the medium of the transverse shaft 57, to the right. The wiper plank will rest by reason of gravity on the platform and prongs and scrape the load to the right, eventually to become removed from the outer ends of said prongs. The lifter 69 with cross pin 70 will rotate upwardly counterclockwise with forcible rotation of the quadrant and rotatably lift the tongues 58 to cause them to be elevated to their dotted line position in said Fig. 1. Upward movement of said tongues will rotate the transverse shaft 57 counterclockwise thus to cause the lug 59 to become engaged back of the latch 60.

The wiper levers and wiper plank need to be returned to their full line position in Fig. 1 before each succeeding load can be scooped up, and this is accomplished in response to elevation of the piston 41 and the rack 42, by forcing fluid under pressure into the lower end portion of the cylinder 40, by way of the hose 45. The curvilinear tongues 58 of course will remain in their upper latched position while said wiper levers and wiper plank are being returned from their dotted line position to their full line position in said Fig. 1.

What is claimed is:

1. In a manure loader, a vehicle frame, transversely spaced, vertical bars rigid with a forward end of said frame, a carriage including an upright transversely extending member assembled with said vertical bars for slidable upward and downward movement, a horizontal transversely extending platform rigid with and extending forwardly from a lower portion of said transversely extending member and transversely spaced prongs extending forwardly from said platform in the plane thereof, an arm rigid with and extending forwardly from the transversely extending member, a transverse shaft rotatably mounted in said arm, a wiper lever rigid with and extending downwardly from said transverse shaft, a transverse wiper plank to be rested on and scraped over said platform and prongs pivoted to and disposed forwardly of said wiper lever, an upright cylinder rigid with said transversely extending member at the rear thereof, a piston in said cylinder and extending upwardly therefrom, hoses for hydraulic fluid leading into said cylinder above and below said piston, a forwardly facing vertical rack at the front of and guided for upward and downward movement relative to said transversely extending member, means above the transversely extending member securing said piston and rack to each other, and a vertical, longitudinally extending quadrant rigid with said transverse shaft at the rear thereof and in mesh with said rack.

2. The combination as specified in claim 1, a second transverse shaft above said transverse shaft rotatably mounted in said wiper lever, transversely spaced tongues rigid with and extending forwardly from said second transverse shaft, a lug rigid with the second transverse shaft, a latch rotatably mounted on said quadrant and engageable with said lug, spring means for retaining said latch in engagement with said lug, a cord for manually releasing the lug against force of said spring means, an upright post rigid with one of said wiper levers, an ear rigid with and extending downwardly from said second transverse shaft, a tension spring normally urging said tongues to be swung downwardly connected between said post and said ear, and means rigid with said quadrant for limiting the extent to which said tongues can be swung downwardly when released.

3. In a manure loader, a vehicle frame, a carriage including an upright transversely extending member assembled with said frame for upward and downward movement, a horizontal transversely extending platform rigid with and extending forwardly from a lower portion of said transversely extending member and transversely spaced prongs extending forwardly from said platform in the plane thereof, an arm rigid with and extending forwardly from the transversely extending member, a transverse shaft rotatably mounted in said arm, a wiper lever rigid with and extending downwardly from said transverse shaft, a transverse wiper plank to be rested on and scraped over said platform and prongs pivoted to and disposed forwardly of said wiper lever, an upright cylinder rigid with said transversely extending member at the rear thereof, a piston in said cylinder and extending upwardly therefrom, hoses for hydraulic fluid leading into said cylinder above and below said piston, a forwardly facing vertical rack at the front of and guided for upward and downward movement relative to said transversely extending member, means above the transversely extending member securing said piston and rack to each other, and a vertical, longitudinally extending quadrant rigid with said transverse shaft at the rear thereof and in mesh with said rack.

4. In a manure loader, a vehicle frame, a carriage including an upright transversely extending member assembled with said frame for upward and downward movement, a horizontal transversely extending platform rigid with and extending forwardly from a lower portion of said transversely extending member and transversely spaced prongs extending forwardly from said platform in the plane thereof, an arm rigid with and extending forwardly from the transversely extending member, a transverse shaft rotatably mounted in said arm, a wiper lever rigid with and extending downwardly from said transverse shaft, a transverse wiper plank to be rested on and scraped over said platform and prongs pivoted to and disposed forwardly of said wiper lever, an upright cylinder rigid with said transversely extending member at the rear thereof a piston in said cylinder and extending upwardly therefrom, hoses for hydraulic fluid leading into said cylinder above and below said piston, a forwardly facing vertical rack at the front of and guided for upward and downward movement relative to said transversely extending member, means above the transversely extending member securing said piston and rack to each other, a vertical, longitudinally extending quadrant rigid with said transverse shaft at the rear thereof and in mesh with said rack, a second transverse shaft above said transverse shaft rotatably mounted in said wiper lever, transversely spaced tongues rigid with and extending forwardly from said second transverse shaft, a lug rigid with the second transverse shaft, a latch rotatably mounted on said quadrant and engageable with said lug, spring means for retaining said latch in engagement with said lug, a cord for manually releasing the lug against force of said spring means, an upright post rigid with one of said wiper levers, an ear rigid with and extending downwardly from said second transverse shaft, a tension spring normally urging said tongue to be swung downwardly connected between said post and said ear, and means rigid with said quadrant for limiting the extent to which said tongue can be swung downwardly when released.

5. In a manure loader, a vehicle frame, a carriage on said frame including an upright transversely extending member, a horizontal transversely extending platform rigid with and extending forwardly from a lower portion of said transversely extending member and transversely spaced prongs extending forwardly from said platform in the plane thereof, an arm rigid with and extending forwardly from the transversely extending member, a transverse shaft rotatably mounted in said arm, a wiper lever rigid with and extending downwardly from said transverse shaft, a transverse wiper plank to be rested on and scraped over said platform and prongs pivoted to and disposed forwardly of said wiper lever, an upright cylinder rigid with said transversely extending member at the rear thereof, a piston in said cylinder and extending upwardly therefrom, hoses for hydraulic fluid leading into said cylinder above and below said piston, a forwardly facing vertical rack at the front of and guided for upward and downward movement relative to said transversely extending member, means above the transversely extending member securing said piston and rack to each other, and a vertical, longitudinally extending quadrant rigid with said transverse shaft at the rear thereof and in mesh with said rack.

6. In a manure loader, a vehicle frame, a carriage on said frame including an upright transversely extending member, a horizontal transversely extending platform rigid with and extending forwardly from a lower portion of said transversely extending member and transversely spaced prongs extending forwardly from said platform in the plane thereof, an arm rigid with and extending forwardly from the transversely extending member, a transverse shaft rotatably mounted in said arm, a wiper lever rigid with and extending downwardly from said transverse shaft, a transverse wiper plank to be rested on and scraped over said platform and prongs pivoted to and disposed forwardly of said wiper lever, an upright cylinder rigid with said transversely extending member at the rear thereof, a piston in said cylinder and extending upwardly therefrom, hoses for hydraulic fluid leading into said cylinder above and below said piston, a forwardly facing vertical rack at the front of and guided for upward and downward movement relative to said transversely extending member, means above the transversely extending member securing said piston and rack to each other, a vertical longitudinally extending quadrant rigid with said transverse shaft at the rear thereof and in mesh with said rack, a second transverse shaft above said transverse shaft rotatably mounted in said wiper lever, transversely spaced tongues rigid with and extending forwardly from said second transverse shaft, a lug rigid with the second transverse shaft, a latch rotatably mounted on said quadrant and engageable with said lug, spring means for retaining said latch in engagement with said lug, a cord for manually releasing the lug against force of said spring means, an upright post rigid with one of said wiper levers, an ear rigid with and extending downwardly from said second transverse shaft, a tension spring normally urging said tongue to be swung downwardly connected between said post and said ear, and means rigid with said quadrant for limiting the extent to which said tongue can be swung downwardly when released.

References Cited in the file of this patent

UNITED STATES PATENTS

| | | |
|---|---|---|
| 1,170,654 | Martin | Feb. 8, 1916 |
| 2,372,870 | Willrodt | Apr. 3, 1945 |
| 2,468,378 | Scofield | Apr. 26, 1949 |
| 2,873,874 | Best et al. | Feb. 17, 1959 |